United States Patent [19]
Aas et al.

[11] Patent Number: 5,940,740
[45] Date of Patent: Aug. 17, 1999

[54] METHOD AND APPARATUS FOR MESSAGE TRANSMISSION VERIFICATION

[75] Inventors: David Aas, Maple Valley; Ileana A. Leuca, Bellevue, both of Wash.

[73] Assignee: AT&T Wireless Services, Inc., Kirkland, Wash.

[21] Appl. No.: 08/740,277

[22] Filed: Oct. 25, 1996

[51] Int. Cl.[6] .................................................. H04Q 7/12
[52] U.S. Cl. ............................................................ 455/31.3
[58] Field of Search .................................... 455/31.3, 412, 455/413; 379/88.25, 88.26; 340/825.44

[56] References Cited

U.S. PATENT DOCUMENTS

| | | | |
|---|---|---|---|
| 4,901,341 | 2/1990 | Carter et al. | 379/67 |
| 4,940,963 | 7/1990 | Gutman et al. | 455/31.3 |
| 4,972,461 | 11/1990 | Brown et al. | 379/88.26 |
| 5,224,150 | 6/1993 | Neustein | 379/57 |
| 5,247,497 | 9/1993 | Cohn | 369/26 |
| 5,473,667 | 12/1995 | Neustein | 379/57 |
| 5,519,718 | 5/1996 | Yokev | 375/202 |
| 5,546,444 | 8/1996 | Roach, Jr. et al. | 455/412 |

*Primary Examiner*—Andrew M. Dolinar

[57] ABSTRACT

A method and apparatus improve the user friendliness of messaging systems. A message sender is requested to create a message ID which is used to identify a message being sent by the message sender. At some later time the message sender can query the message center using the sender generated message ID to ask the center to verify whether the message has either been sent to or received by the intended recipient.

6 Claims, 5 Drawing Sheets

| SUBSCRIBER ID | MESSAGE | MESSAGE ID | MESSAGE STATUS INDICATOR |
|---|---|---|---|
| ABCD1234 | XXX-XXXX | YYYY | 0 |
| ABCD1234 | NNN-NNNN | LLLL | 1 |
| ⋮ | ⋮ | ⋮ | ⋮ |

METHOD AND APPARATUS FOR MESSAGE TRANSMISSION VERIFICATION

BACKGROUND OF THE INVENTION

The present invention relates to a method and apparatus for verifying that a message has been transmitted to or received by an intended recipient. In particular, the present invention relates to the manner in which the message sender can access verification information.

Paging systems are well known. Generally, a sender accesses a message center and identifies the intended recipient of a message. The sender then provides a message to the center and the message is stored for subsequent transmission. The center then transmits the message to the intended recipient. In a one-way messaging system, such as in one-way paging, there is no way to determine if the recipient has received the message. At best, the message center or paging terminal can monitor whether the message has been transmitted. In a two-way messaging or paging system, two different types of acknowledgment may be received by the message center. First, a network acknowledgment may be received. A network acknowledgment signal indicates that the recipient's pager has received the transmitted message. A second level of acknowledgment may be desirable where the recipient's terminal, for example, a pager transmits a message back to the message center when the recipient has accessed the message thereby providing a "read acknowledgment" to the message center.

It is desirable to provide the message sender with the capability of determining whether a message has been sent and received by the intended recipient.

A number of techniques for such message verification are known in the prior art. Verification techniques are provided in U.S. Pat. No. 5,224,150 and, U.S. Pat. No. 5,473,667 both to Neustein and U.S. Pat. No. 5,519,718 to Yokev et al. In the two Neustein patents, both related to paging, the message sender also has a paging device and is apprised of the transmission of the paging message because when the center transmits the message it sends it to both the intended recipient and the sender. When the sender receives the message this indicates to the sender that the message has been sent to the intended recipient. In the patent by Yokev et al. the messaging center places a return call to the message sender after the message has been sent and a pre-recorded message is played to notify the sender of the receipt of the message by the recipient.

In another known configuration the messaging center automatically assigns a message ID number to each received message. The message center then announces that message ID number to the message sender at the time the message is provided to the message center. The message sender is then advised to use the message ID to later request verification of receipt of the message by the intended recipient.

All of these known techniques for message verification have shortcomings. With regard to the first system disclosed in the Neustein patents, the message sender must have their own pager to be able to receive notice that the message has been transmitted to the intended recipient. In the system disclosed in the Yokev patent, the sender must be available at a particular location to receive the call-back information. In the system where the message center assigns a message ID, the message sender must memorialize that ID and retain that information until such time as he or she attempts to verify receipt of the message. All of these techniques make message verification a more difficult and awkward operation for the message sender. It is desirable to provide a more user-friendly technique for verifying the receipt of messages by an intended recipient.

SUMMARY OF THE INVENTION

In accordance with the present invention, a messaging system includes a messaging center that receives a message ID that is selected and generated by the message sender. The message center then associates that unique message ID with a message to be transmitted to an intended recipient. When verification of receipt of the message is later requested, the message sender enters information including the message ID to determine the receive status of the entered message. Since the message ID was created by the message sender it is easier for the user to retain that message ID and have the information available at the later time when verification is requested.

In accordance with a modification to the present invention the message itself can be treated as the message ID and the message sender will not be asked to create and supply a separate message ID.

In one verification process, the message sender will be asked whether they intend to send a message or verify receipt of a message. If the caller selects the latter option then the caller will be asked to enter the message ID and a subscriber ID to identify a specific message of interest. The message center then examines a message receipt indicator associated with that message and which reflects whether the center has received an acknowledgment subsequent to the transmission of the message.

In another modification, the message center will not automatically ask the message sender whether they wish to select a verification action. Instead, the sender will be prompted to enter the message and message ID (or the message alone) and the system will check to see whether that same message has already been stored in a message table. If it is so stored then the system will check to see how long the message has been residing in the table. If the message has been stored for some period of time greater than a set predetermined time no message receipt verification will be performed and the most recent received message will be treated as a new message to be transmitted to the intended recipient. If, however, the amount of time that has transpired is less than the predetermined time then a verification operation will be automatically conducted. If the operation detects that a message has already been sent and received then the center will advise the sender of that fact and ask if they wish to have the message resent.

The arrangement of the present invention provides for an enhanced user-friendly interface to the messaging system that facilitates verification of the receipt of messages.

DETAILED DESCRIPTION

The present invention may be employed in various messaging systems. The following description refers to a two-way paging system. But this is intended to be an example only. The invention is also applicable in messaging systems that provide Short Message Service (SMS) messages.

Figure 1A:
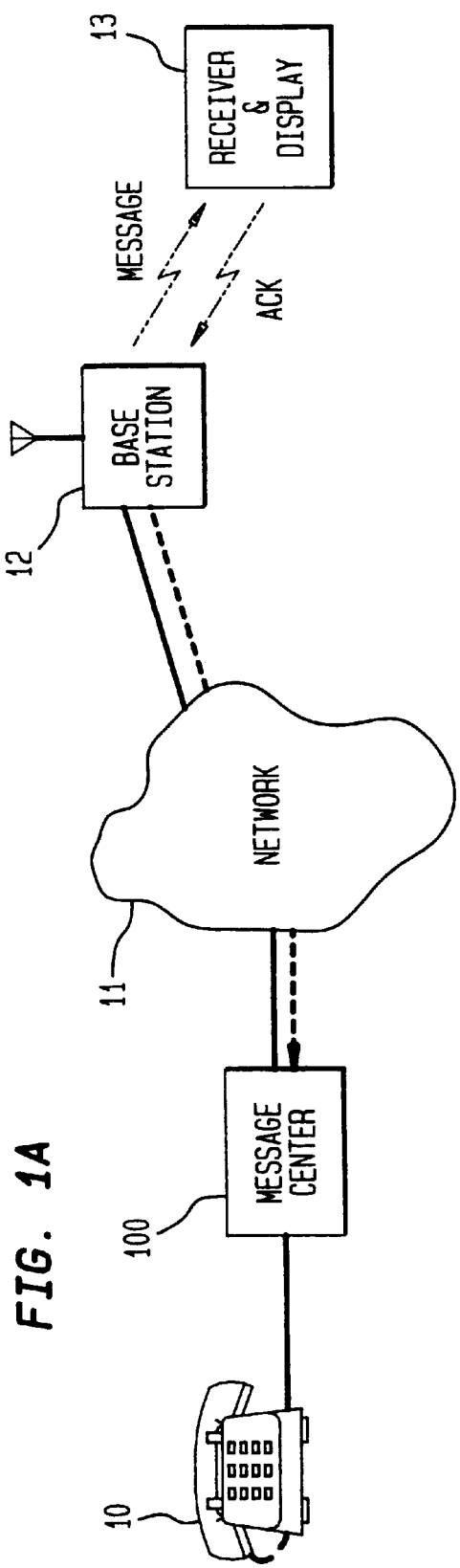
FIG. 1A illustrates, in schematic form, an example of a two-way messaging system in which the present invention may be employed.

An example of a two-way paging system in which the present invention can be employed is illustrated in FIG. 1A. A message sender can operate telephone 10 to access message center 100. The connection to the message center could be either by the Public Switch Telephone Network (PSTN) or by wireless communication (e.g., cellular). As described in detail below, the message center 100 prompts the message sender for entry of relevant message related information. Upon completion of receipt of the message the center terminates the connection to the message sender. The message center subsequently sends a message out through network 11 to a base station 12 where the message is transmitted over the air to a device such as a pager 13, which includes a receiver and a display. The pager 13 also has the capability of sending back at least an acknowledgment that the message has been received by the pager. The network acknowledgment signal (represented as Ack in the drawing figure) is transmitted to the base station. The base station then transfers this network acknowledgment to the message center. The message center then associates the network acknowledgment with the transmitted message.

Figure 1B:
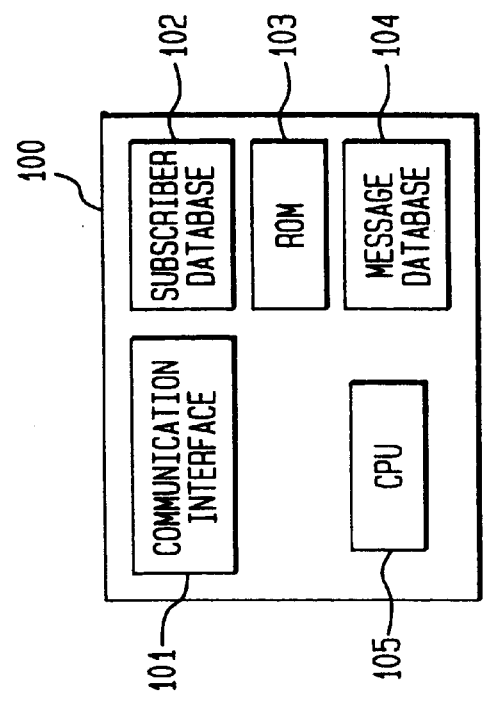
FIG. 1B illustrates, in block diagram form, an example of a message center of the system of FIG. 1A, in which the present invention may be employed.

An example of the elements which could be included in the message center 100 is illustrated in FIG. 1B. The center could include a communication interface 101 which provides access to the PSTN for connection to the message sender as well as access to the network 11 for transmitting the message to the pager 13. A subscriber database 102 includes information about the parties subscribing to the paging service, including subscriber ID information. A read-only memory (ROM) 103 stores the programs that control the operation of the message center. A message database 104 stores the messages received from message senders as well as acknowledgment information transmitted back to the message center by the recipients (the transmission path shown by the dashed lines in FIG. 1A). The center also includes a CPU 105 that controls the communication interface and controls accesses to the subscriber database and message database. The programs stored in the ROM can define the operations of the CPU. Those stored programs incorporate the techniques described in the flow charts shown in FIGS. 2 and 4 to 6 so as to provide a more user-friendly interface to a message sender who is interested in determining whether a message has been received by the intended recipient.

Figure 2:
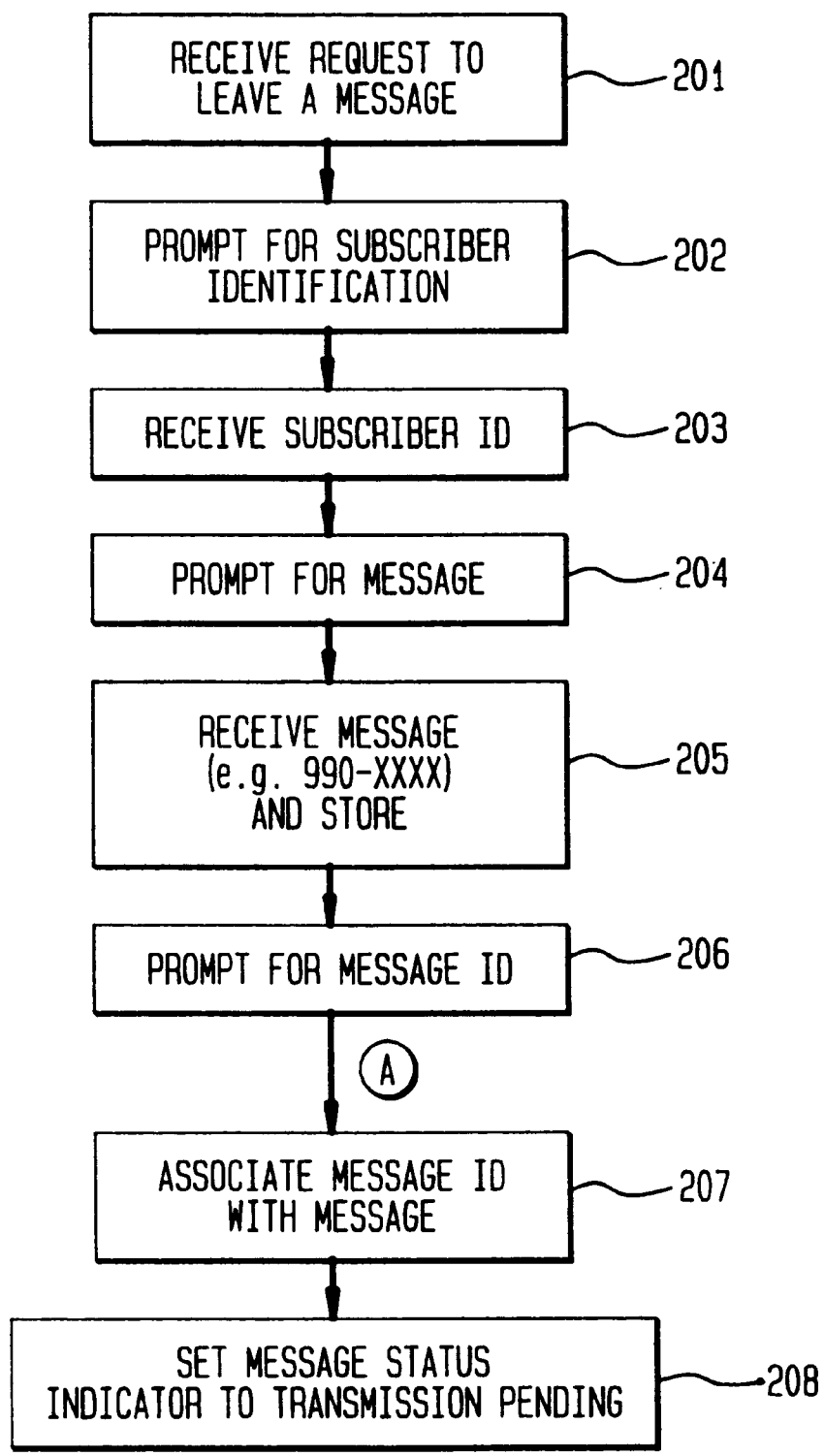
FIG. 2 is a flow chart representation of the operations to be conducted by the message center in creating a message record in accordance with the present invention.

FIG. 2 is a flow chart that illustrates the operations that can be performed by the message center to register a message and associate a user generated message ID with the message. First, the message center receives a request to leave a message from a message sender, step 201. Next, the message center prompts the message sender to provide subscriber information, step 202. The message sender can be asked to either enter the ID information via touch tone signaling on a telephone keypad or by speaking the subscriber identification information. The message center then receives the subscriber ID, step 203. In that regard the communication interface 101 of FIG. 2 must be able to accept the received subscriber information and recognize it. Thus, in connection with the examples given the interface must either recognize DTMF signaling or must provide speech recognition. After receiving the subscriber ID, the message center prompts the sender for the message, step 204. As before, the message can be entered either by DTMF signaling or by voice. The message center then receives the message, for example, 990-XXXX, and stores the message in a message database (104 FIG. 1B), step 205. The message center then prompts the sender to provide a message ID, step 206. The message center, upon receipt of the message ID generated by a message sender, associates the message ID with the message, step 207. The center then sets a message status indicator associated with the message so as to indicate that transmission of the message is pending, step 208.

Figures 3, 4:
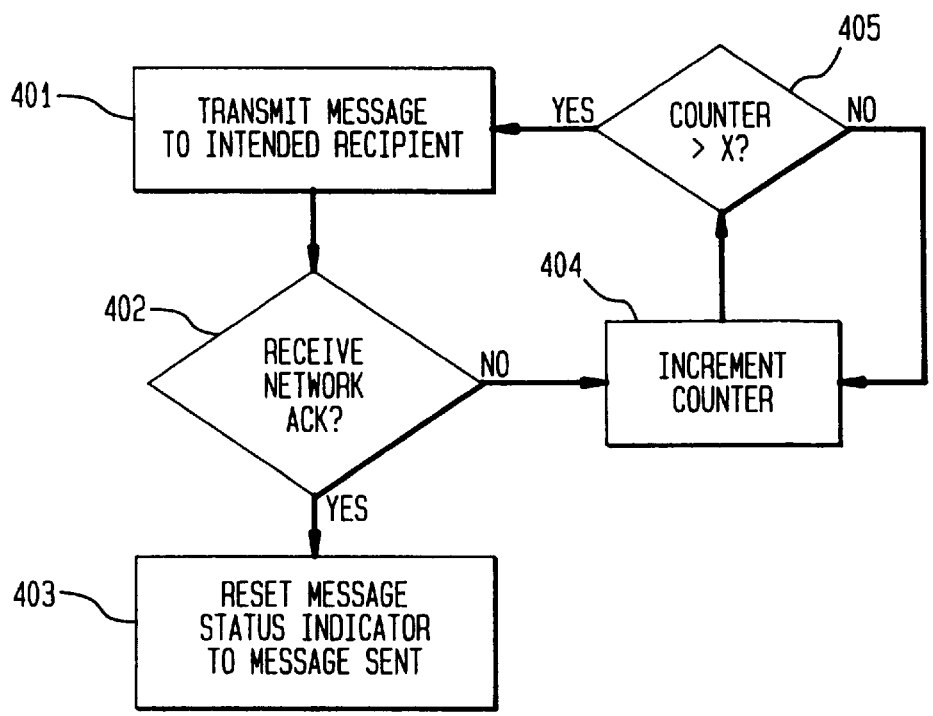
FIG. 3 illustrates an example of a message table which could be stored in the message database of FIG. 1B in accordance with the present invention.
FIG. 4 is a flow chart indicating the operations undertaken by the message center in monitoring the receipt of a message by the intended recipient.
Figure 5:
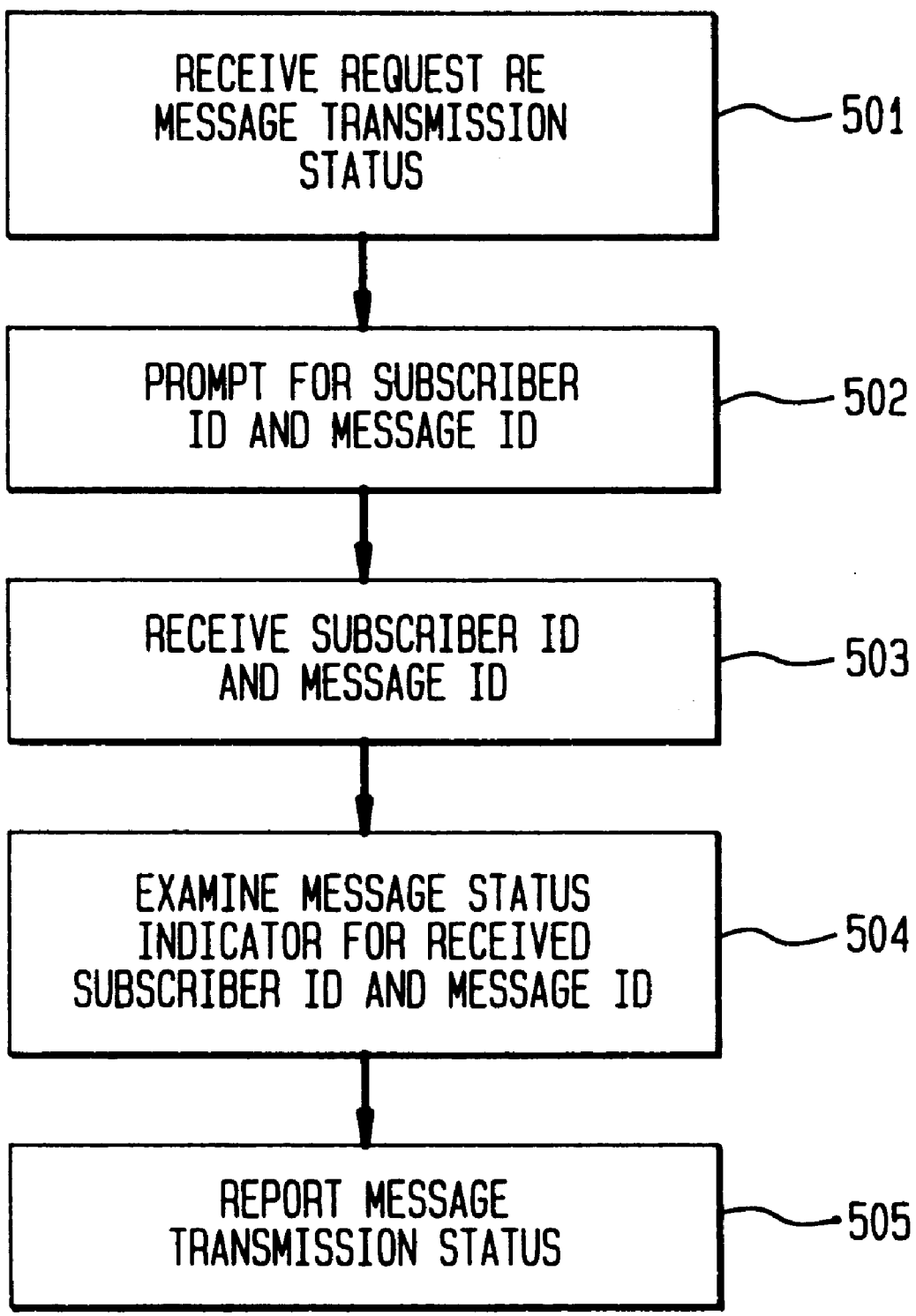
FIG. 5 provides a flow chart describing the steps performed by the message center to verify to the message sender receipt of a message by the intended recipient in accordance with an embodiment of the present invention.
Figure 6:
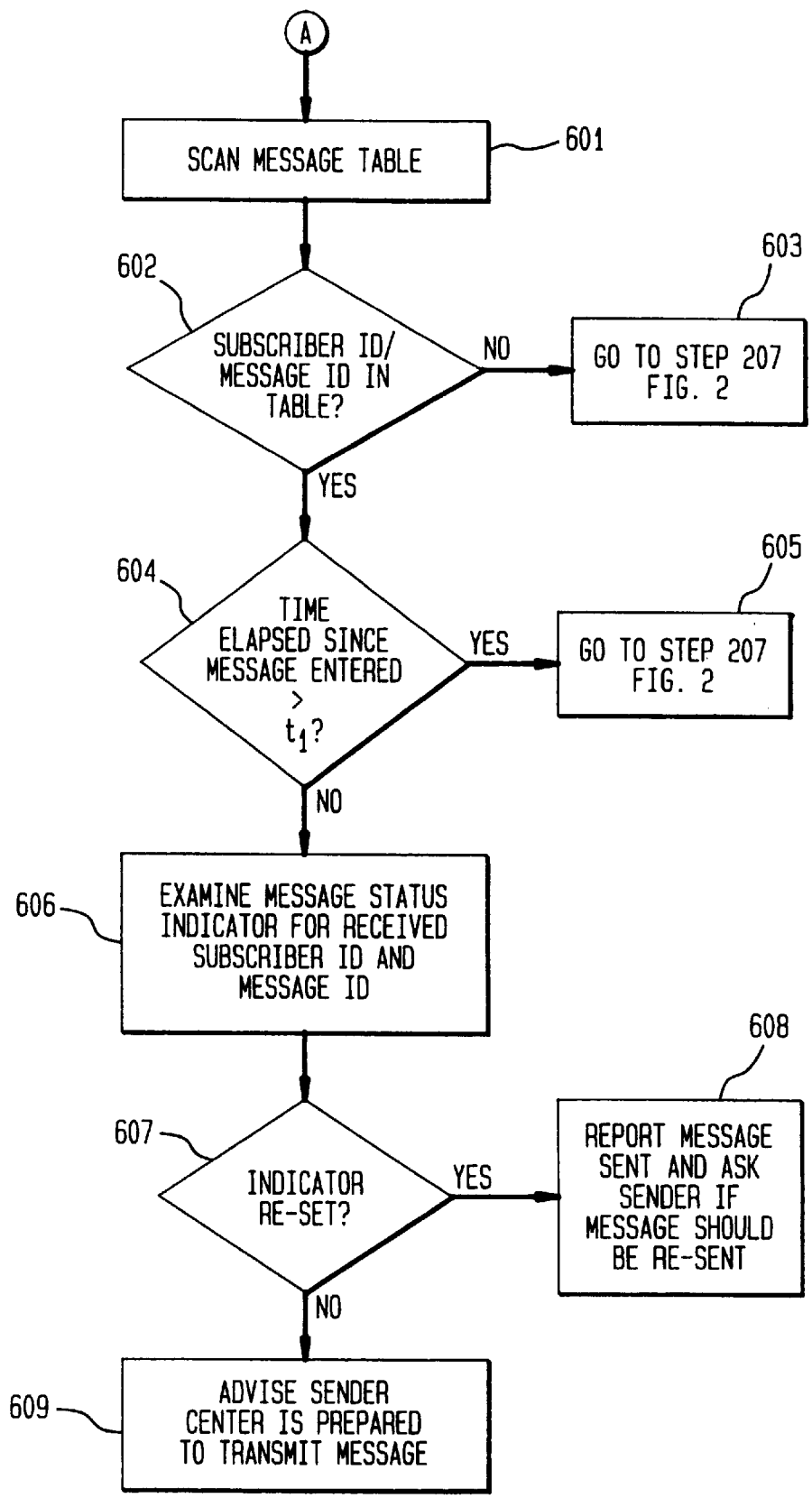
FIG. 6 is a flow chart that describes a second embodiment of the present invention for verifying message receipt of the message by the intended recipient.

An example of the information stored in the message database is illustrated in tabular form in FIG. 3. Each line of the table 300 could be considered a message separate entry. Each entry would be constituted by a plurality of fields of information. A first field, 301 stores subscriber ID information. A second field, 302, stores the message. A third field, 303, stores the message ID generated and supplied by the message sender. A fourth field, 304, stores an indication of the status of the receipt of the message. In the example shown in FIG. 3, "0" is used to represent that the message has not yet been received by the recipient. The notation "1" indicates that the associated message has been received by the recipient, that is a network acknowledgment has been received.

In an alternative configuration the message status indicator could indicate that the message has been transmitted by the message center rather than indicate receipt of the message by the recipient. In such a case, the status indicator would not rely upon receipt of any acknowledgment signals at the message center. The remainder of this description refers to verifying receipt of the message by the intended recipient. However, one skilled in the art would recognize that these principles are applicable to systems where the center only monitors whether the message has been sent.

FIG. 3 is only one example of a potential format for a message database structure. The invention is not limited to this format. Furthermore, the invention is not limited to the specific order of prompting and receiving information illustrated in FIG. 2. For instance, after receiving the subscriber ID, the message center could prompt the sender to provide a message ID prior to providing the message itself.

In yet another modification in accordance with the present invention, instead of prompting for a separate message ID, the message center can treat the entered message itself as the message ID. This would avoid the need for performing steps 206 and 207 of FIG. 2. So long as the message center treats the message itself as the message ID it will be capable of doing the necessary scanning of the database to determine message status as described in connection with the flowcharts of FIGS. 5 and 6.

FIG. 4 is a flowchart that generally describes the operation of the message center in tracking the status of the message. First, the message center transmits the message to the intended recipient, step 401. The center then detects whether a network acknowledgment has been received, step 402. If such an acknowledgment has been received, then the recipient is presumed to have received the message and in step 403 the center resets the message status indicator to indicate that the message has been sent and received. In the example shown in FIG. 3, for instance, entry 31 indicates that the message has not as yet been received by the intended recipient. However, if the center receives an acknowledgment that the message has been received then the message status indicator would be changed from "0" to "1". If after transmission of the message the center does not receive the network acknowledgment then a counter 404 can be incremented so as to effect the operation of a timer. When the elapsed time since the last transmission attempt exceeds a predetermined time period that corresponds to counter value "x" then (step 405) the center again attempts to transmit the message to the intended recipient, returning to step 401.

In accordance with the present invention, the message sender can re-access the message center to obtain information about whether the message has been received by the intended recipient. Two such message verification schemes are described in connection with FIGS. 5 and 6 respectively.

In a first verification scheme, the message center receives a request for message transmission status information, step 501. Such a request could be entered by a user in response to a prompt to identify whether the user wishes to send a message or to verify receipt of a message. Once the request is received the center prompts the user to provide the subscriber ID and message ID information associated with the message of interest, step 502. Subsequently, the center receives this information, step 503 and examines the message status indicator for the message associated with the subscriber ID and message ID supplied, step 504. This examination requires a scanning of the message database to locate the message of interest and then an examination of the message status indicator associated with that message to determine "received" status. Once the status indicator is examined, the center reports the status to the user who is seeking the information, step 505.

In an alternative embodiment the caller to the message center is not greeted by a decision tree that asks whether the caller is interested in sending a message or verifying a message. Instead, the message center automatically determines whether a verification operation should be conducted and when necessary does so. This operation is described with reference to FIG. 6. In such a configuration the message center treats a call initially as a request to leave a message and performs steps 201 to 206 of FIG. 2. Then, having received all of the information necessary to identify a particular message, the center scans the message table, 601 looking for the message in question. If the subscriber ID/message ID combination is not found in the message table as tested in step 602, then the message center goes to step 207 of FIG. 2 (step 603) and the call is treated as a request to send the message. If, however, the message table does contain this subscriber ID/message ID combination then the center determines the amount of time that has elapsed since the message has been entered into that system. This can be done by time stamping the message as it is first received and then comparing that time stamp the time the later access occurs. If the time elapsed has exceeded some predetermined value then the system automatically assumes that the call is a request to send a new message and is not related to the earlier message. The system under those circumstances goes directly to step 207 of FIG. 2 and performs no verification (step 605). If, however, the elapsed time is less than the predetermined time then the system treats the call as an attempt to verify the receipt of the previously provided message. Thus, the center examines the message status indicator for the received subscriber ID/message ID combination, step 606. The system detects whether the indicator has been reset (step 607) such as would occur when the message center receives a network acknowledgment (see steps 402 and 403 of FIG. 4). If the indicator has been reset then the center reports to the user that the previous message has been sent and then asks if the message should be re-sent, step 608. If the indicator has not been re-set then the center can advise the sender that it is prepared to transmit the message to the intended recipient, step 609. In the latter circumstance, it is up to the discretion of the message center as to whether it is necessary to inform the user that the message has not already been sent.

The above described message verification system provides enhanced accessibility to message senders. The system permits the sender to place a request for information about a message at any time and allows the user to define the information necessary to identify a particular message within the message database. This avoids the generation of message ID's at the message center and also avoids the potential problem of the message sender failing to maintain the message identification information generated by the message center.

The present invention could be utilized in environments other than the paging environment where message databases receive messages from message senders and subsequently transmit those messages to intended recipients since the invention would provide an easy way for the message sender to verify the receipt by (or transmission to) the intended recipient.

What is claimed is:

1. A method by which an originator of a message can verify receipt of the message by an intended recipient comprising the steps of:

storing a message for the intended recipient;

associating an indicator of receipt status with said message;

receiving a request to verify receipt of said message, said request including said message; and analyzing said indicator of receipt status associated with said message in response to said request.

2. The method of claim 1 wherein said step of storing stores said message in a message database and said step of analyzing includes the sub-step of searching said database to match a message in a request to verify with a message in said database.

3. A system that provides verification of receipt of a message by an intended recipient, the system comprising:

a database storing a receipt status indicator associated with a message; and a processor receiving a request for receipt status of a message, said request including a message identifier created by the originator of the message, wherein said processor searches said database using said message identifier to determine receipt status of a message, wherein said message identifier includes said message.

4. A method by which an originator of a message can verify transmission of the message to an intended recipient comprising the steps of:

storing a message for the intended recipient;

associating an indicator of transmission status with said message;

receiving a request to verify transmission of said message, said request including said message; and analyzing said indicator of transmission status associated with said message in response to said request.

5. The method of claim 4 wherein said step of storing stores said message in a message database and said step of analyzing includes the sub-step of searching said database to match a message in a request to verify with a message in said database.

6. A system that provides verification of transmission of a message to an intended recipient, the system comprising:

a database storing a transmit status indicator associated with a message; and a processor receiving a request for transmission status of a message, said request including a message identifier created by the originator of the message, wherein said processor searches said database using said message identifier to determine transmission status of a message, wherein said message identifier includes said message.

* * * * *